United States Patent [19]

Hayashi et al.

[11] 4,259,896
[45] Apr. 7, 1981

[54] APPARATUS TO CONTROL THE AIR FLOW IN AN AUTOMOBILE

[75] Inventors: Kazuo Hayashi; Fujio Takahashi, both of Yokohama, Japan

[73] Assignees: Nissan Motor Company, Limited; Ikeda Bussan Co., Ltd., both of Kanagawa, Japan

[21] Appl. No.: 116,796

[22] Filed: Jan. 30, 1980

[30] Foreign Application Priority Data

Jan. 31, 1979 [JP] Japan .................................. 54-9109

[51] Int. Cl.³ .......................... A47C 7/74; B60H 1/00
[52] U.S. Cl. ...................................... 98/2.03; 297/453; 62/244
[58] Field of Search ............... 98/2, 2.03; 297/180, 297/453; 62/244; 165/42

[56] References Cited

U.S. PATENT DOCUMENTS

| | | | |
|---|---|---|---|
| 908,085 | 12/1908 | Freschl | 297/453 |
| 1,674,535 | 6/1928 | Verville | 98/2.03 |
| 2,195,010 | 3/1940 | Meek | 98/2.03 |
| 2,782,834 | 2/1957 | Vigo | 297/180 |
| 3,295,886 | 1/1967 | Goldmerstein | 297/180 |
| 4,118,062 | 10/1978 | Harder, Jr. et al. | 98/2.03 |

FOREIGN PATENT DOCUMENTS

| | | | |
|---|---|---|---|
| 2335180 | 12/1975 | France | 297/180 |
| 6716904 | 12/1967 | Netherlands | 297/453 |

*Primary Examiner*—Henry C. Yuen
*Attorney, Agent, or Firm*—Schwartz, Jeffery, Schwaab, Mack, Blumenthal & Koch

[57] ABSTRACT

An apparatus to control the air flow in an automobile comprises a box which is provided beneath a seat and has openings respectively formed in the upper wall and the front wall thereof, a fan which is mounted to the rear wall of the box and of which the rotation can be reversed, a switching plate which is provided in the box in such a way as to selectively close the opening formed in the upper wall and the opening formed in the front wall, and a means to drive the switching plate so as to selectively open either one of said openings in synchronism with the switching of the rotation of the fan, thereby the air is forcibly upwardly passed through the seat or the hot air from a heater or the cold air from a cooler provided in front of the seat is forcibly sent rearwardly through said box.

7 Claims, 5 Drawing Figures

APPARATUS TO CONTROL THE AIR FLOW IN AN AUTOMOBILE

BACKGROUND OF THE INVENTION

The present invention relates to an apparatus to control the air flow in an automobile, and in particular to an apparatus to forcibly blow air upward through a seat from a box provided beneath the seat toward a passenger on the seat, or forcibly send the hot air from a heater or the cold air from a cooler provided in front of the seat rearwardly through the box so as to warm or cool the legs or lower parts of passengers on the rear seat.

A passenger, especially the driver, in a front seat of an automobile is apt to sweat around the surface of the seat especially during the summer season even if the windows are opened or the cooler is used. Thus the seat can quickly become sticky and uncomfortable.

Also, a conventional heater means or cooler means for an automobile has a defect in that the hot air from the heater or the cold air from the cooler warms or cools only the top of the passengers on the rear seat because the gap between the seat and the floor is usually so small that the hot air from the heater or the cold air from the cooler cannot pass through the gap to warm or cool the legs and lower parts of the passengers.

Despite efforts to make the passengers in an automobile as comfortable as possible, the prior art has failed to provide any means which can fully overcome the above problems.

SUMMARY OF THE INVENTION

With the above in mind, an object of the present invention is to provide an apparatus to control the air flow in an automobile which has a function to make the passenger, especially the driver on the front seat comfortable or cool by blowing the air through the seat from a box provided beneath the seat towards him.

Another object of the present invention is to provide an apparatus to control the air flow in an automobile which has a function to forcibly send the hot air from a heater or the cold air from a cooler provided in front of the seat rearwardly through the box provided beneath the seat.

Still another object of the present invention is to provide an apparatus to control the air flow in an automobile which is capable of making a choice between the above-mentioned two functions.

According to the present invention, there is provided an apparatus to control the air flow in an automobile which comprises a box provided beneath a seat and having openings respectively formed in the upper wall and the front wall thereof, a fan mounted to the rear wall of the box of which the rotation can be reversed, a switching plate which is provided in the box in such a way as to selectively close the opening formed in the upper wall and the opening formed in the front wall, and a means to drive the switching plate so as to close selectively either one of said openings in synchronism with the switching of the rotation of the fan, thereby the air is forcibly upwardly passed through the seat or the hot air from a heater or the cold air from a cooler provided in front of the seat is forcibly sent rearwardly through the box.

BRIEF DESCRIPTION OF THE DRAWINGS

The features and advantages of an apparatus to control the air flow in an automobile in accordance with the present invention will become apparent from the following description taken in conjunction with the accompanying drawings, in which.

In all the drawings, the same reference numeral indicates the same or corresponding elements.

DETAILED DESCRIPTION OF THE PRESENT INVENTION

The present invention will now be described in terms of a preferred embodiment, and with reference to the accompanying drawings.

Figure 1:
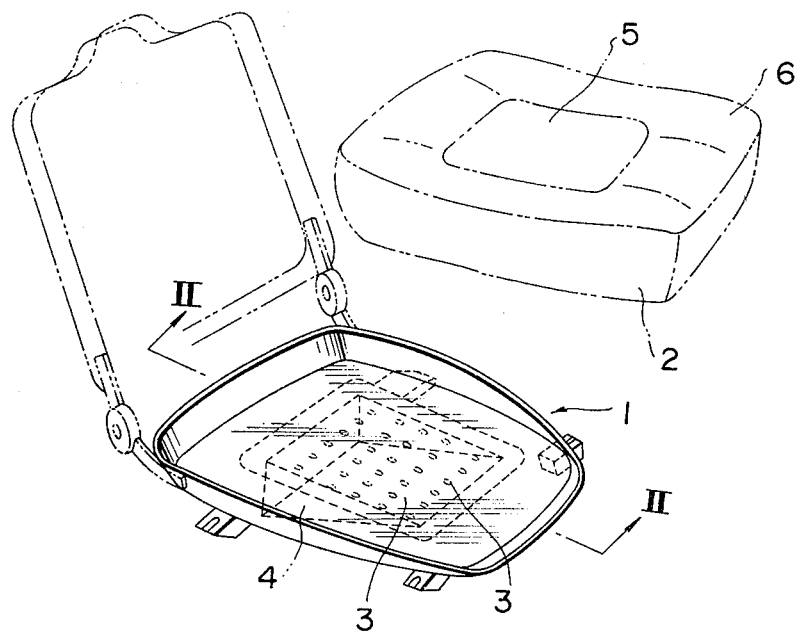
FIG. 1 is a perspective view of a dismantled seat assembly including a tray to which a cushion is fitted and beneath which an apparatus to control the air flow in accordance with the present invention is attached.

In FIG. 1, reference numeral 1 denotes a tray on which a seat cushion 2 is provided. At the central part of this tray 1 are formed a plurality of pores 3, through which air may flow from a box 4 provided beneath the tray 1. The seat cushion 2 comprises an inner cushion 5 formed of porous material, an outer cushion 6 formed of non-porous material which surrounds the inner cushion 5 and a cover 7 formed of porous sheet material which envelopes the inner cushion 5 and the outer cushion 6.

Figure 2:
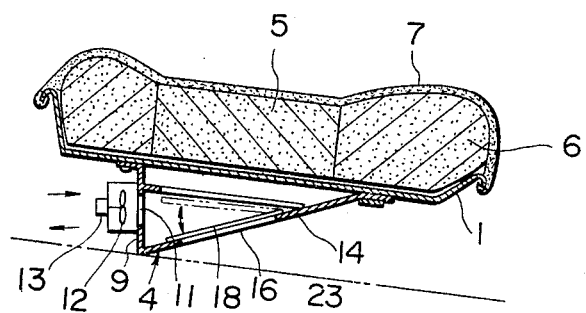
FIG. 2 is a partial cross-sectional view taken along line II—II in FIG. 1.
Figure 3:
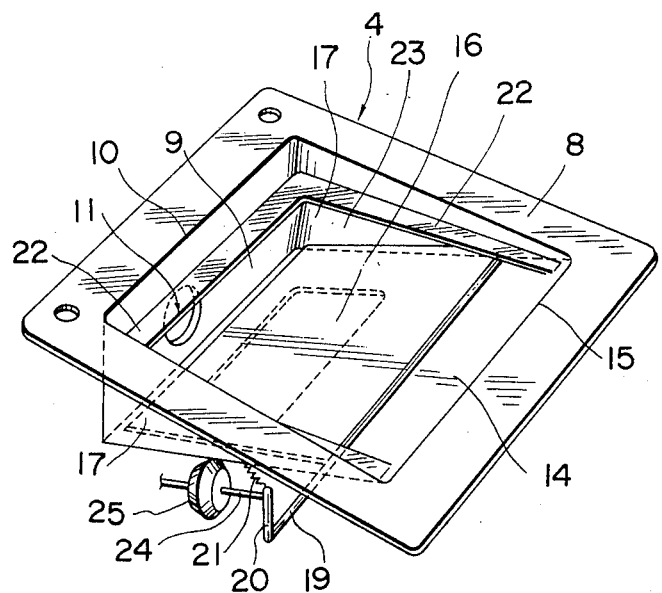
FIG. 3 is a perspective view of an apparatus to control the air flow in an automobile according to the present invention.

As clearly seen from FIG. 2 and FIG. 3, the box 4 includes a substantially square shaped flange 8 to attach the box 4 to the tray 1. A rear wall 9 extends substantially perpendicularly downward from the rear inner edge 10 of the flange 8. An opening 11 is formed in this rear wall 9 and a fan 12 of which the rotation can be reversed is mounted to the rear wall 9. The fan 12 blows air into the box 4 through the opening 11 when it is driven in the forward direction and blows air out of the box 4 through the opening 11 in the rearward direction when the rotation of the fan 12 is reversed. Reference numeral 13 denotes a DC motor for driving the fan 12.

A front wall 14 extends obliquely from the lower end of the rear wall 9 to the forward inner edge 15 of the flange 8. A rectangular opening 16 is formed at the center of the front wall 14. Reference numeral 17 denotes substantially right angled triangular side walls.

A switching plate 18 is supported in this box 4 rotatable around a shaft 19 which is fixed to the forward end of the front wall 14. Short connecting rods 20 are fixed to both ends of the shaft 19 in such a way as to be substantially perpendicular thereto. Return springs 21 are provided between the lower surface of the flange 8 and the free ends of the short rods 20 so that the switching plate 18 is rotated anticlockwise around the shaft 19 by the tension thereof and close the rectangular opening 16 formed in the front wall 14. Reference numeral 22 denotes a stopper plate to limit the rotational upward movement of the switching plate 18. That is, the switching plate 18 can rotate between the position where it is in contact with the front wall 14 and closes the opening 16 and the position where it is in contact with the stopper plate 22 and closes the upper opening 23. The switching plate 18 is rotated by the substantially horizontal movement of rods 24 of actuator means 25 of which only one is shown in the diagram. One end of each rod 24 is connected to one end of the one of the short rods 20. That is, if the force to horizontally move the rods 24 of the actuator means 25 overcomes the tension of the return springs 21, a clockwise rotational force works on the shaft 19, and the switching plate 18 rotates from the position as shown in FIG. 3 to the position as indicated by the dashed line in FIG. 2. In this case, the manifold vacuum is used to operate the actuator means 25 so as to move the rods 24 horizontally as mentioned above.

Figure 4:
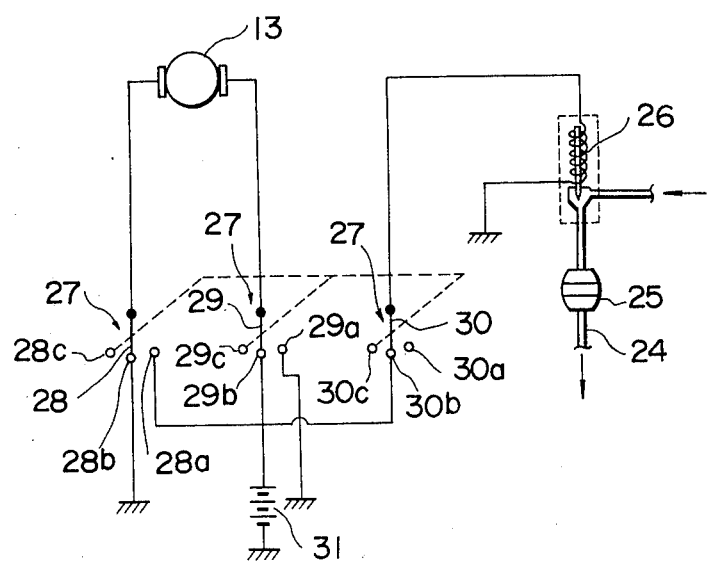
FIG. 4 is a circuit diagram showing a switching means for controlling the rotation of the fan and the actuation of a switching plate.

In FIG. 4, an electric circuit including a switching means 27 is shown for controlling the direction of rotation of the DC motor 13 and a solenoid valve 26 to apply the manifold vacuum to the actuator means 25. This switching means 27 is a 3 pole 3 way switch: two contacts 28 and 29 switch the rotational direction of the motor 13 and one contact 30 energizes the solenoid valve 26. In this circuit, the three contacts 28, 29 and 30 are switched together between sets of three terminals (28a, 28b, 28c), (29a, 29b, 29c), and (30a, 30b, 30c). The terminals 28a, 29b and 30b are connected to the plus terminal of a DC power source 31, the terminals 28b and 29a are grounded and the remaining terminals 28c, 29c, 30a and 30c are open. The DC motor 13 is connected in series between the contact 28 and the contact 29. The solenoid valve 26 is connected to the contact 30.

If the contacts 28, 29 and 30 are respectively connected to the terminals 28a, 29a and 30a, an electric current flows from the plus terminal of the DC power source 31 through the contact 28, the DC motor 13, the contact 29 to ground so as to drive the DC motor 13 in the forward direction. As the result, the fan 12 is driven in the forward direction and blows air into the box 4 through the opening 11 formed in the rear wall 9. At this time, the solenoid valve 26 is not energized and thus the manifold vacuum is not applied to the actuator means 25. Therefore, the switching plate 18 is in contact with the front wall 14 so as to close the rectangular opening 16 formed in the front wall 14.

Then, if the contacts 28, 29 and 30 are respectively switched to the terminals 28b, 29b and 30b, an electric current flows from the plus terminal of the DC power source 31 through the contact 29, the DC motor 13, the contact 28 to ground to drive the DC motor 13 in the reverse direction. As the result, the fan 12 is driven in the reverse direction.

At the same time, an electric current flows from the plus terminal of the DC power source 31 through the contact 30, the solenoid valve 26 to ground, thereby energizing and opening the solenoid valve 26 to introduce the manifold vacuum into the actuator means 25. As a consequence, a force to overcome the tension of the return spring 21 pushes the rods 24 so as to push and move the same in the direction to turn the short rods 20 clockwise, and thereby the switching plate 18 is moved from the position in contact with the front wall 14 closing the opening 16 formed in the front wall 14 to the position in contact with stopper plate 22 and closing the upper opening 23.

On this occasion, the hot air from a heater or the cold air from a cooler provided in front of the front seat is drawn into the box 4 from the rectangular opening 16 formed in the front wall 14 and then is blown out of the box 4 through the opening 11 formed in the rear wall 9 by means of the fan 12 which is rotating in the reverse direction.

Figure 5:
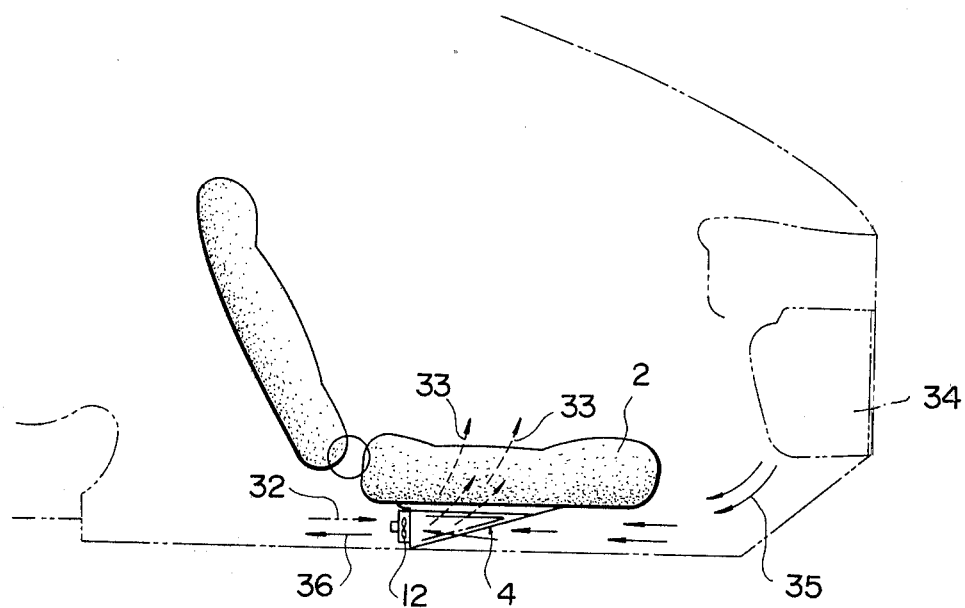
FIG. 5 is an explanatory view showing the function of an apparatus to control the air flow in an automobile in accordance with the present invention.

Now, the air flow control in an automobile in accordance with the apparatus of this invention which is constituted as mentioned above will be explained with reference to the FIG. 5.

When the temperature in the automobile is high and the driver on the front seat 2 is apt to sweat and the surface of the seat 2 tends to become uncomfortable, the switching means 27 is actuated in such a way that the contacts 28, 29 and 30 are respectively connected to the terminals 28a, 29a and 30a. By so doing, the DC motor 13 and the fan 12 are driven in the forward direction without energizing the actuator means 25 for the switching plate 18. At this time, the air above the floor behind the seat 2 is drawn into the box 4 through the opening 11 formed in the rear wall 9 as indicated by the arrow 32 in FIG. 5 by means of the fan 12 which is driven in the forward direction. Then, the fan 12 blows the air upwards through the plurality of pores 3 formed in the tray 1 and the cover 4 which is formed of porous sheet material and the inner cushion 5 formed of porous material towards the driver who sits on the front seat 2 as indicated by the arrows 33. Therefore, the driver on the front seat 2 is kept cool and comfortable even in close contact with the surface of the seat 2 because he is prevented from sweating by the air flow towards him through the seat 2.

On the other hand, when the heater or cooler 34 which is provided in front of the seat 2 is used, the switching means 27 is actuated in such a way that the contacts 28, 29 and 30 are respectively connected to the terminals 28b, 29b and 30b. By so doing, the DC motor 13 is driven in the reverse direction and the fan 12 rotates in the reverse direction. At the same time, the solenoid valve 26 is energized and opened, and thereby the manifold vacuum is supplied to the actuator means 25 so as to rotate the switching plate 18 from the position in contact with the front wall 14 and closing the rectangular opening 16 formed in the front wall 14 to the position in contact with the stopper plate 22 and closing the upper opening 23. As a result, the hot air from the heater 34 or the cold air from the cooler 34 which flows downwards as indicated by the arrows 35 in FIG. 5 in drawn into the box 4 through the rectangular opening 16 formed in the front wall 14 by means of the fan 12 which is rotating in the reverse direction. Then, the fan 12 blows out the warm or cold air thus drawn into the box 4 through the opening 11 formed in the rear wall 9 in the rearward direction as indicated by the arrow 36 so as to warm or cool the legs and lower parts of passengers on the rear seats.

As will be clear from the foregoing description, an apparatus to control the air flow in an automobile in accordance with the present invention is constituted in such a way that the air is passed through the seat from a box provided beneath the seat towards a driver who sits on the seat. Accordingly, the driver is prevented from sweating, and the surface of the seat does not become sticky and uncomfortable.

Futher, the apparatus to control the air flow in an automobile in accordance with the present invention is constituted in such a way that the hot air from a heater or the cold air from a cooler provided in front of the seat is forcibly sent rearwards through the box provided beneath the seat. Accordingly, the hot air from the heater or the cold air from the cooler is capable of sufficiently warming or cooling the legs and lower parts of the passengers, and thus uniform warming or cooling of the automobile is ensured.

While the present invention has been described in terms of a preferred embodiment, and with reference to the drawings, this is not to be taken as limitative of the present invention, which is rather to be defined by the appended claims. In particular, the size, shape and arrangement of the box 4 or the type of vehicle to which the box 4 is attached may be varied to suit the particular application, and the box 4 may be provided not only beneath the front seat but also beneath the rear seat.

What is claimed is:

1. An apparatus to control the air flow in an automobile comprising;
    a box which is provided beneath a seat and which has a rear opening, a front opening and an upper opening;
    a fan of which the rotation can be reversed and which is mounted to the box in such a way as to blow air into and blows air out of the box;
    a switching plate which is provided in the box in such a way as to selectively close either one of the front opening and the upper opening;
    a means to drive the switching plate so as to close selectively either one of the front opening and the upper opening in synchronism with the switching of the rotation of the fan;
    thereby the air is forcibly passed upwards through the seat or the hot air from a heater or the cold air from a cooler provided in front of the seat is forcibly sent rearwards through the box.

2. An apparatus to control the air flow in an automobile as claimed in claim 1, wherein said box consists of a substantially square shaped flange to attach said box to a porous pan in which the seat is put, a rear wall which extends perpendicularly downwards from the rear inner edge of said flange, a front wall which obliquely extends from the lower end of the rear wall until the forward inner edge of the flange and substantially right angled triangular side walls.

3. An apparatus to control the air flow in an automobile as claimed in claim 2 wherein said switching plate is rotatably mounted at the upper part of the front wall.

4. An apparatus to control the air flow in an automobile as claimed in claim 3 wherein said fan is driven by means of a DC motor.

5. An apparatus to control the air flow in an automobile as claimed in claim 3 wherein said switching plate closes the opening formed in the front wall of the box by means of spring force of return springs when said DC motor is driven in the forward direction and closes the upper opening 23 by utilizing the negative pressure in the manifold which overcomes the spring force of the return springs when said DC motor is driven in the reverse direction.

6. An apparatus to control the air flow in an automobile as claimed in claim 5 wherein a means including a relay is provided for switching the driving direction of the DC motor and the switching plate.

7. An apparatus to control the air flow in an automobile as claimed in claim 1 wherein said seat comprises an inner cushion formed of porous material, an outer cushion formed of non-porous material which surrounds said inner cushion and a cover formed of porous sheet material which envelopes said inner cushion and outer cushion.

* * * * *